United States Patent
Kikuchi et al.

(10) Patent No.: US 7,136,573 B2
(45) Date of Patent: Nov. 14, 2006

(54) RECORDING RATE AUTOMATIC SETTING RECORDING DEVICE AND RECORDING RATE AUTOMATIC SETTING RECORDING METHOD

(75) Inventors: Shinichi Kikuchi, Yokohama (JP); Hideo Kataoka, Tokyo (JP); Kazuya Fujita, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1200 days.

(21) Appl. No.: 09/986,161

(22) Filed: Nov. 7, 2001

(65) Prior Publication Data

US 2002/0054754 A1    May 9, 2002

(30) Foreign Application Priority Data

Nov. 8, 2000    (JP)    ............... 2000-340912

(51) Int. Cl.
*H04N 5/76* (2006.01)
*H04N 7/00* (2006.01)
*H04N 7/06* (2006.01)
*H04N 7/08* (2006.01)
*H04N 7/52* (2006.01)
*H04N 5/85* (2006.01)

(52) U.S. Cl. ..................... 386/83; 386/46; 386/95; 386/125; 725/58

(58) Field of Classification Search .............. 386/46, 386/125, 126, 83, 95; 725/58
See application file for complete search history.

(56) References Cited

U.S. PATENT DOCUMENTS 5,737,481 A    4/1998    Gushima et al.
6,584,272 B1 *  6/2003    Fukushima et al. ........... 386/46
6,671,454 B1 * 12/2003    Kaneko et al. ................ 386/83

FOREIGN PATENT DOCUMENTS

| | | |
|---|---|---|
| EP | 0 802 682 A1 | 10/1997 |
| EP | 0 942 416 A2 | 9/1999 |
| JP | 8-017137 * | 1/1996 |
| JP | 8-17137 | 1/1996 |
| JP | 10-134551 | 5/1998 |
| JP | 11-39850 | 2/1999 |
| JP | 11-176096 | 7/1999 |
| JP | 11-316703 | 11/1999 |
| JP | 2000-333169 | 11/2000 |
| WO | WO 9222983 * | 12/1992 |

OTHER PUBLICATIONS

European Search reported dated Feb. 16, 2006 for Appln. No. 01126438.9.

* cited by examiner

*Primary Examiner*—Thai Tran
*Assistant Examiner*—Gelek Topgyal
(74) *Attorney, Agent, or Firm*—Pillsbury Winthrop Shaw Pittman LLP

(57) ABSTRACT

A recording rate automatic setting recording device which, a microcomputer block, detects a recording time on the basis of recording reservation information, and detects an entire capacity and a remaining capacity of a first recording surface of an information recording medium, and assumes that a capacity which is at least half of the entire capacity of the first recording surface is a remaining capacity of a second recording surface of the information recording medium, and calculates an entire remaining capacity by adding together the remaining capacity of the first recording surface and the remaining capacity of the second recording surface, and sets a recording bit rate from the entire remaining capacity and a reservation recording time.

7 Claims, 15 Drawing Sheets

RECORDING RATE AUTOMATIC SETTING RECORDING DEVICE AND RECORDING RATE AUTOMATIC SETTING RECORDING METHOD

CROSS-REFERENCE TO RELATED APPLICATIONS

This application is based upon and claims the benefit of priority from the prior Japanese Patent Application No. 2000-340912, filed Nov. 8, 2000, the entire contents of which are incorporated herein by reference.

BACKGROUND OF THE INVENTION

1. Field of the Invention

The present invention relates to an information recording device which can record information onto a hard disk or the like, and which can play back the information recorded on the hard disk or the like, and which can record information onto recording media such as a DVD (digital versatile disk) or the like, and which can play back the information recorded on the DVD. In particular, the present invention relates to a recording rate automatic setting recording device and a recording rate automatic setting recording method which set a recording bit rate in consideration of recording capacities of a front surface (first recording surface) and a back surface (second recording surface) of a both surfaces recordable DVD.

2. Description of the Related Art

In recent years, optical disk playback devices which handle dynamic images, for playing back optical disks on which dynamic images and audio are recorded, have been developed. These devices, such as, for example, LD, video CD playback devices or the like, have become popular for viewing movie software, enjoying karaoke or the like.

Currently, a DVD standard has been proposed which utilizes the MPEG2 (Moving Image Coding Expert Group) method that has been standardized internationally, and which utilizes the AC3 audio compression method. This standard supports a dynamic image compression method with the MPEG2 method in accordance with an MPEG2 system layer, and supports an audio compression method with the AC3 audio compression method and an MPEG audio compression method. Moreover, supplementary image data in which bitmap data is run-length-compressed can be treated as the subtitles of a movie, karaoke or the like. Further, control data for special playback (a navigation pack) such as fast forward, reverse or the like is added to the standard. Moreover, in the standard, ISO9660 and micro UDF standards are supported such that the data of a disk can be read by a computer.

Further, as a standard of a medium itself, following the standards of DVD-ROMs which are media of DVD-videos, standards of DVD-RAMs (recording capacity: about 4.7 GB) have been completed, and DVD-RAM drives have begun to become popular as peripheral devices of computers.

Further, currently, a standard of RTR (Real Time Recording)-DVDs which utilizes DVD-RAMs is being completed, and the verification operation has been finished. The standard of RTR-DVDs has been conceived of on the basis of the standard of DVD-videos which are currently on the market. Further, a file system corresponding to RTR-DVDs has also been standardized.

Further, a device which can record and play back broadcasting signals by using a built-in hard disk drive (HDD) has appeared. The hard disk drive can record data of, for example, 100 gigabytes or more.

A hard disk device which records information on a hard disk drive, a DVD device which records information on a DVD, and a DVD/hard disk device which records information on both of a hard disk drive and a DVD are all mass recording devices. These devices can record a large number of programs, and, for example, it is predicted that recording based on recording reservations increases.

Further, in order to precisely realize recording reservations, there is the need to precisely recognize the remaining capacity of the disk, and to appropriately set the recording bit rate in accordance with the remaining capacity. For example, if a recording bit rate is set to be high (high vividness) regardless of the fact that the remaining capacity is low, there are cases in which a program cannot be recorded to the end thereof.

Among DVD-RAMs, both surfaces recordable or two-layer recordable disks have been proposed. Disk management information is recorded on the respective recording surfaces or the respective recording layers of the DVD-RAMs. At the time of recording, the disk management information recorded on the target recording surface or recording layer is read, and the entire capacity, the recorded (used) capacity, the free capacity, and the like can be known from the disk management information. However, if there are a plurality of recording surfaces or recording layers, although the remaining capacity of one recording surface or recording layer can be known, the remaining capacities of the other recording surfaces or recording layers cannot be known. Therefore, when a recording reservation or the like is carried out, it is impossible to judge over a plurality of surfaces whether the remaining capacity is appropriate or not for the length of time of the reserved recording program. Simply, when the method is a method which sets the recording bit rate for the remaining capacity read from a single surface, if the remaining capacity is low at the front surface, regardless of the fact that there is sufficient remaining capacity at the back surface, there are cases in which the bit rate is set to be low and poor image quality recording occurs.

An object of the present invention is to provide a recording rate automatic setting recording device and a recording rate automatic setting recording method which can set an appropriate recording bit rate for a disk having a plurality of recording surfaces.

BRIEF SUMMARY OF THE INVENTION

To solve the above-described problems and achieve the objects, a recording rate automatic setting recording device and a recording rate automatic setting recording method are structured as follows.

(1) A recording rate automatic setting recording device of the present invention comprises: recording means for recording a video signal on a predetermined recording surface of an information recording medium; reserved recording time detecting means for, on the basis of recording reservation information, detecting a reserved recording time needed for reserved recording; remaining capacity calculating means for detecting an entire capacity and a remaining capacity of a first recording surface of the information recording medium which can be accessed by the recording means, and for, assuming a capacity which is at least half of the entire capacity of the first recording surface to be a remaining capacity of a second recording surface of the information recording medium, calculating a capacity, in which the remaining capacity of the first recording surface and the remaining capacity of the second recording surface are added together, as an entire remaining capacity; first recording bit rate setting means for setting a recording bit rate, on the basis of the entire remaining capacity calculated by the remaining capacity calculating means and the reserved recording time detected by the recording time detecting means; and first recording control means for, in accordance with the recording bit rate set by the first recording bit rate setting means and the recording reservation information, recording a target video signal onto the first and second surfaces of the information recording medium.

(2) A recording rate automatic setting recording method of the present invention comprises: detecting a reservation recording time needed for reserved recording on the basis of recording reservation information; detecting an entire capacity and a remaining capacity of a first recording surface of an information recording medium; assuming a capacity which is at least half of the entire capacity of the first recording surface to be a remaining capacity of a second recording surface of the information recording medium; calculating a capacity, in which the remaining capacity of the first recording surface and the remaining capacity of the second recording surface are added together, as the entire remaining capacity; setting a recording bit rate, on the basis of the entire remaining capacity and the reservation recording time; and recording a target video signal onto the first and second recording surfaces of the information recording medium in accordance with the recording bit rate and the recording reservation information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, embodiments of the present invention will be described with reference to the drawings.

Figure 1:
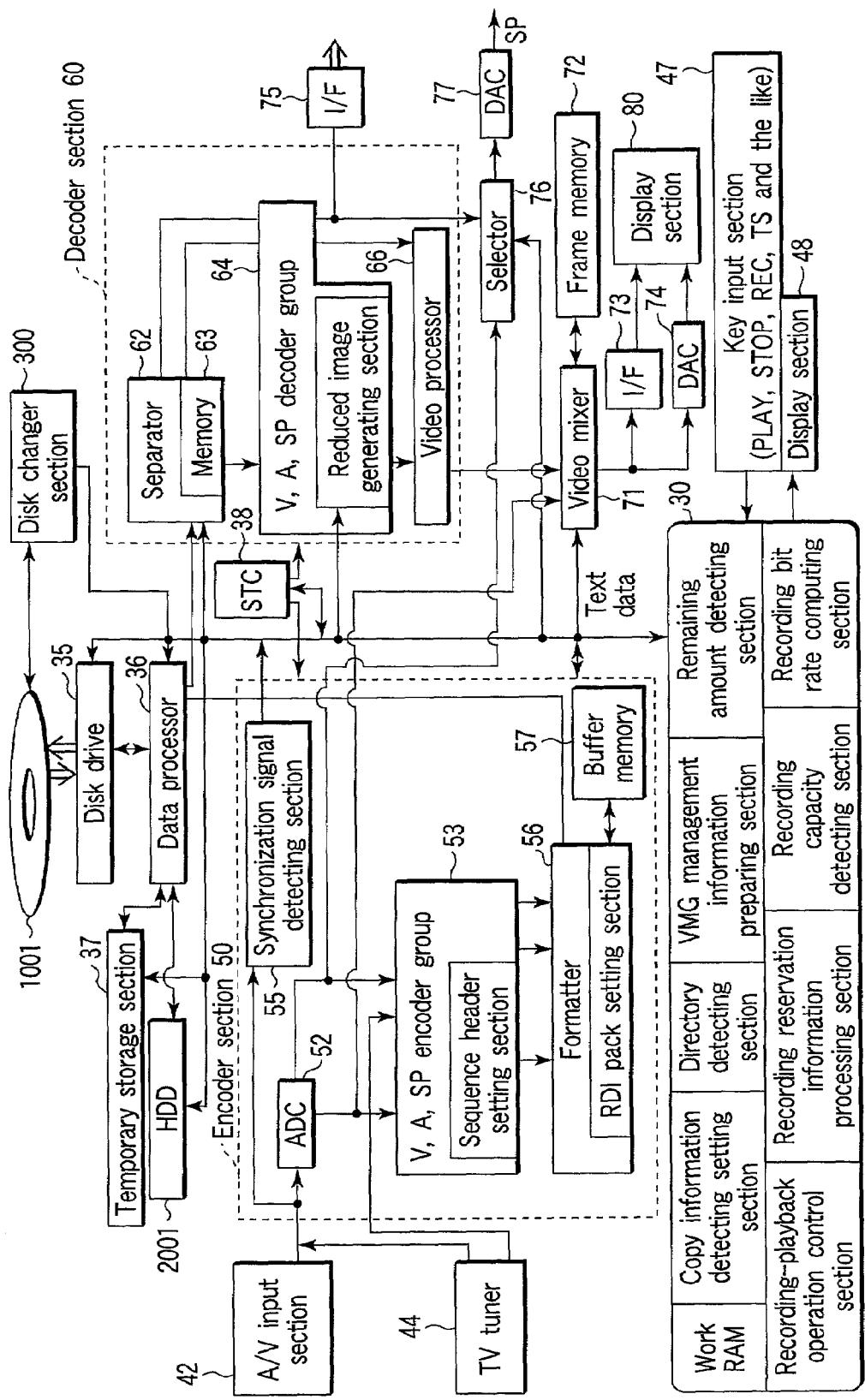
FIG. 1 is a block diagram showing a schematic structure of a recording/playback device according to an embodiment of the present invention.

FIG. 1 is a diagram showing an example of a recording/playback device (a recording rate automatic setting recording device) to which the present invention is applied. Broadly classifying the respective blocks in FIG. 1, the main block of a recording section is shown at the left side, and the main block of a playback section is shown at the right side. The blocks of respective sections of FIG. 1 will be described in detail later.

Figure 2:
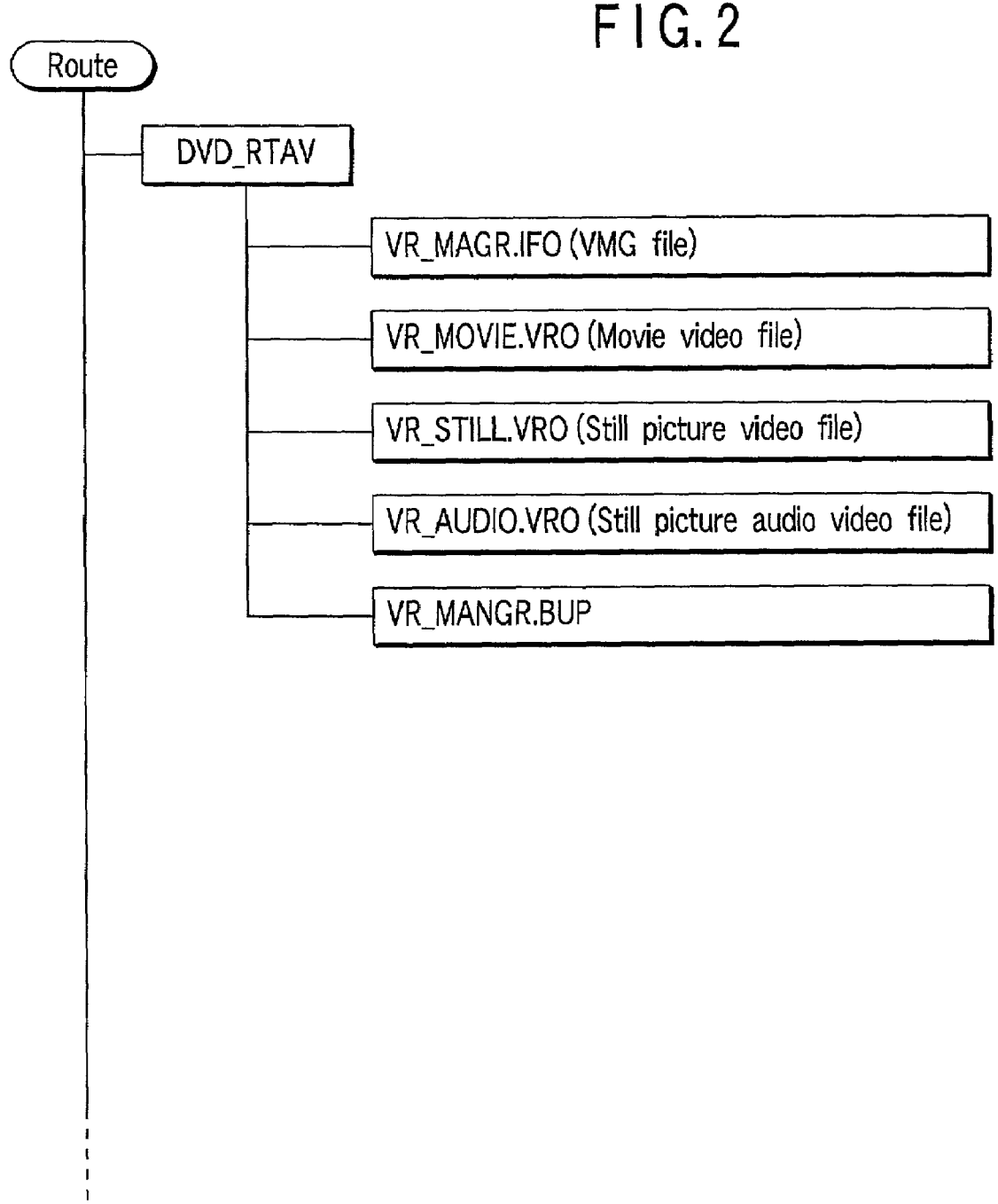
FIG. 2 is a figure showing a portion of a directory structure of a DVD system.

FIG. 2 shows a portion of a directory structure of a DVD system. FIG. 2 shows the directory (which is shown as DVD_RTAV herein) structure of, in particular, a real time recording DVD (RTR-DVD) of a DVD system.

Respective files of VR_MANGR.IFO serving as a video manager file, VR_MOVIE.VRO serving as a movie video file, VR_STILL.VRO serving as a still picture video file, VR_AUDIO.VRO serving as an audio video file, and VR_MANGR.BUP serving as a backup of the video manager, exist in the directory (DVD-RTAV).

Navigation data is recorded in the VR_MANGR.IFO file. This navigation data is data for advancing a program set, a program, an entry point, a play list, or the like.

The VR_MOVIE.VRO file is a so-called movie AV file for recording a movie video object (movie VOB). This VR_MOVIE.VRO is used for recording an original VOB composed of video parts including arbitrary sub-picture units. Further, at this time, audio parts relating to the video parts are also included in the original VOB.

The VR_STILL.VRO is a still picture AV file for recording a still picture VOB.

Further, the VR_AUDIO.VRO is a still picture additional audio file for recording an additional audio stream for a still picture. The still picture additional audio file shows audio streams recorded by after recording. The still picture additional audio file is used in combination with several video parts recorded in the VR_STILL.VRO.

The VR_MANGR.BUP is a backup file of the VR_MANGR.IFO.

Figure 3:
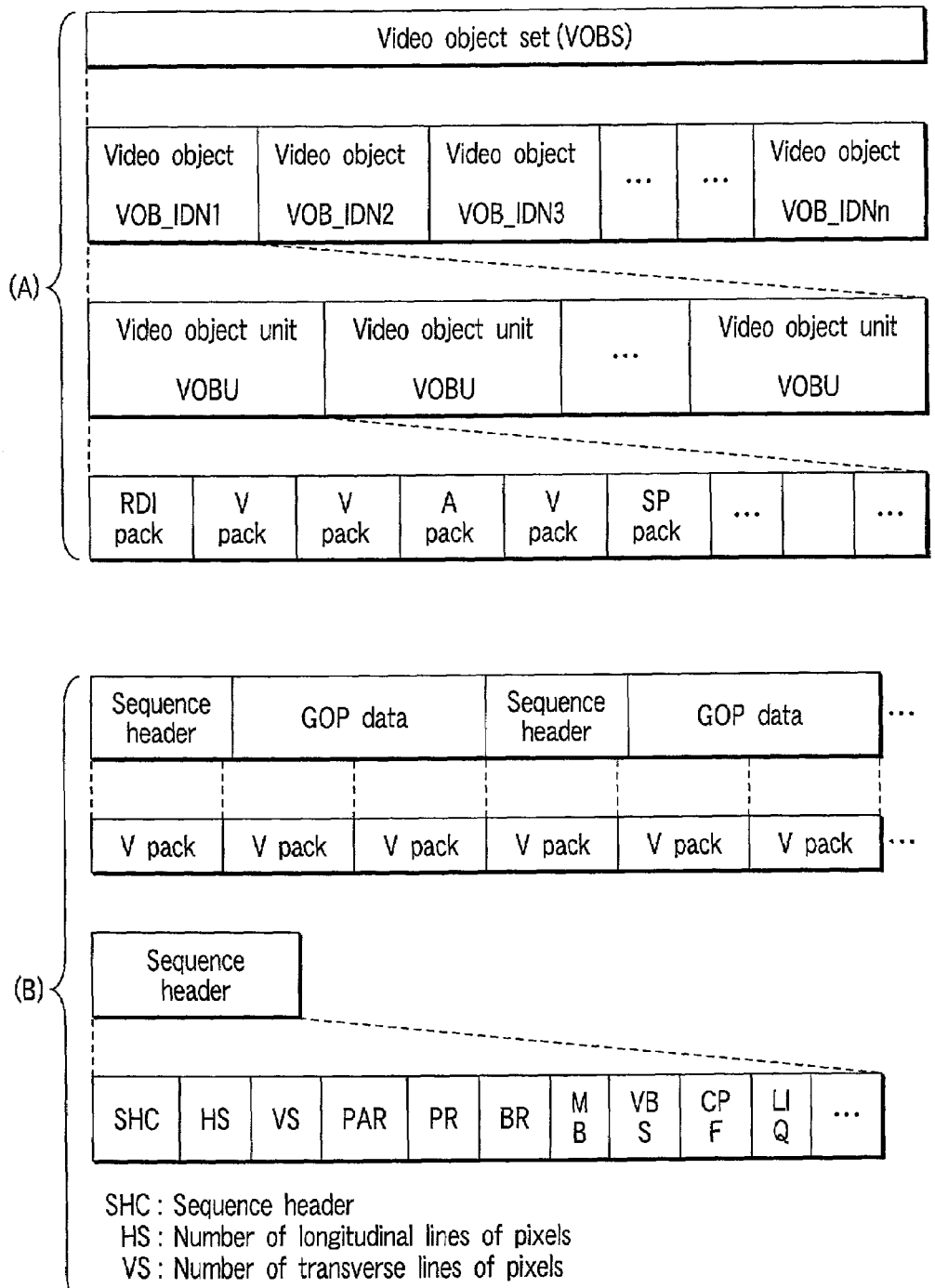
FIG. 3 is a figure showing an example of a format of video data.

FIG. 3 of (A) shows a file structure of the above-described VR_MANGR.VRO.

Video files have a hierarchical structure. A single video file is composed of a plurality of VOBs (video objects). A single VOB is composed of a plurality of VOBUs (video object units). A single VOBU is composed of a plurality of packs. An RDI pack, a V pack, an A pack, and the like exist as the packs.

The V pack is a pack in which video data is compressed by the MPEG2 method, and is composed of a pack header, a packet header, and a video data section. The A pack is a pack in which audio data is processed by a method such as, for example, linear PCM, MPEG, AC3 or the like. The A pack is composed of a pack header, a packet header, and an audio data section.

FIG. 3 of (B) shows a format of video data based on the MPEG2 method.

A group of pictures (GOP) is a compression unit of a plurality of video frames. A sequence header is added to the head of the group of pictures. A starting code (SHC) of the sequence header, a number (HS) of longitudinal lines of pixels, a number (VS) of lateral lines of pixels, an aspect ratio (PAR), and the like are described in the sequence header.

Figure 4:
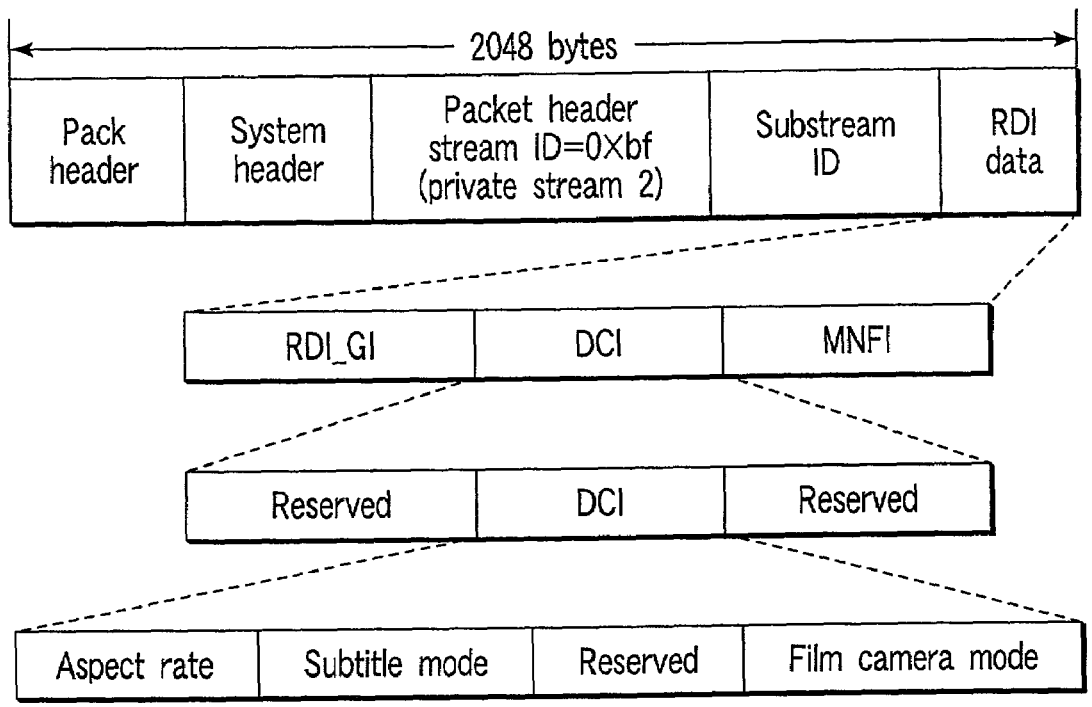
FIG. 4 is a figure showing details of RID data.

The RDI pack shown in FIG. 4 is called a real time data information pack (RDI_PCK). The real time data information pack includes real time general information (RDI_GI), display control and copy control information (DCI_CCI), manufacturer information (MNFI), and the like.

The real time general information (RDI_GI) includes information showing the start time at which the first field of the VOBU to which this information belongs is played back, namely, VOBU_S_PTM, and information showing the recording time of this VOBU, namely, VOBU_REC_TM.

The display control and copy control information (DCI_CCI) includes (DCI_CCI_SS) which shows the status of the display control information (DCI) and the copy control information (CCI), and the display control information (DCI) itself, and the copy control information (CCI) itself.

Among the (DCI_CCI_SS), a display control information status (DCI_SS) identifies a case in which only effective aspect ratio information exists (01b), and a case in which an effective aspect ratio, a subtitle mode, and a film camera mode exist (11b).

The display control information (DCI) includes aspect ratio information, subtitle mode information, and the film camera mode.

The aspect ratio information shows that the aspect ratio is 4:3 (0000b), or that the aspect ratio is 16:9 (0001b). When a source picture is a letter box, the aspect ratio information identifies that the letter box (14:9) is a screen center arrangement (1000b), the letter box (14:9) is a screen top arrangement (0100b), the letter box (16:9) is a screen center arrangement (1101b), the letter box (16:9) is a screen top arrangement (0010b), the letter box (>16:9) is a screen center arrangement (1010b), and the letter box (14:9) is a full format and center arrangement.

The subtitle mode identifies that the subtitle does not open (00b), the subtitle is in an active image area (01b), and the subtitle is out of an active image area (10b).

The film camera mode identifies a camera mode (0b), and a film mode (1b).

Figure 5:
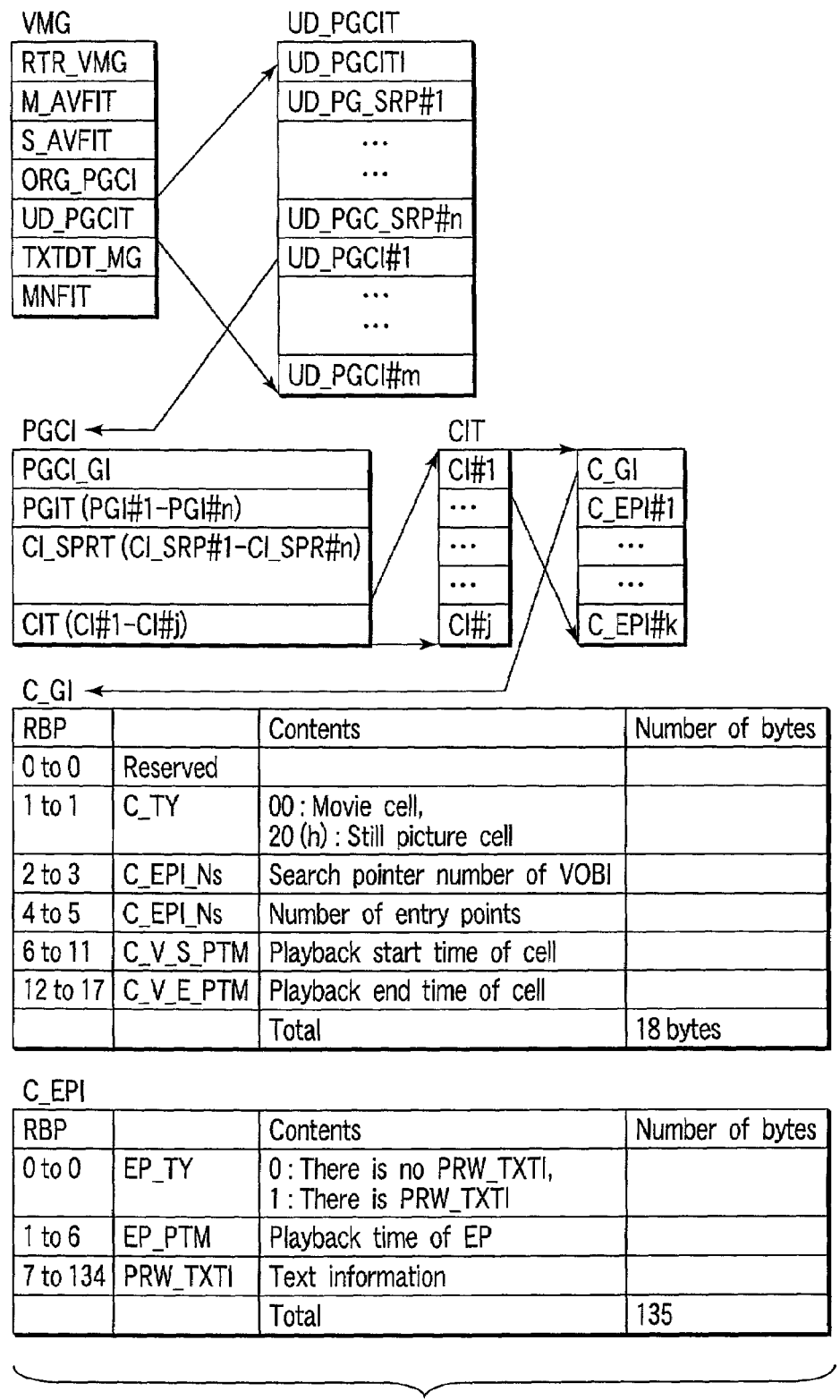
FIG. 5 is a figure showing a hierarchical structure of a video manager (VMG).

FIG. 5 is a figure showing the hierarchical structure of the video manager (VMG) and showing a management system of a data playback procedure.

The data playback procedure recorded in the video file is defined by a program chain (PGC) such as shown in FIG. 5. In this program chain (PGC), a cell (Cell) is defined. In the cell (Cell), the VOB to be played back is defined. The portion of the PGC on which concrete information is recorded is program chain information (PGCI) among the VMG files. There are two types of PGCIs: one is an original PGCI (ORG_PGCI), and the other one is a user defined PGC table (UD_PGCIT).

Figure 6:
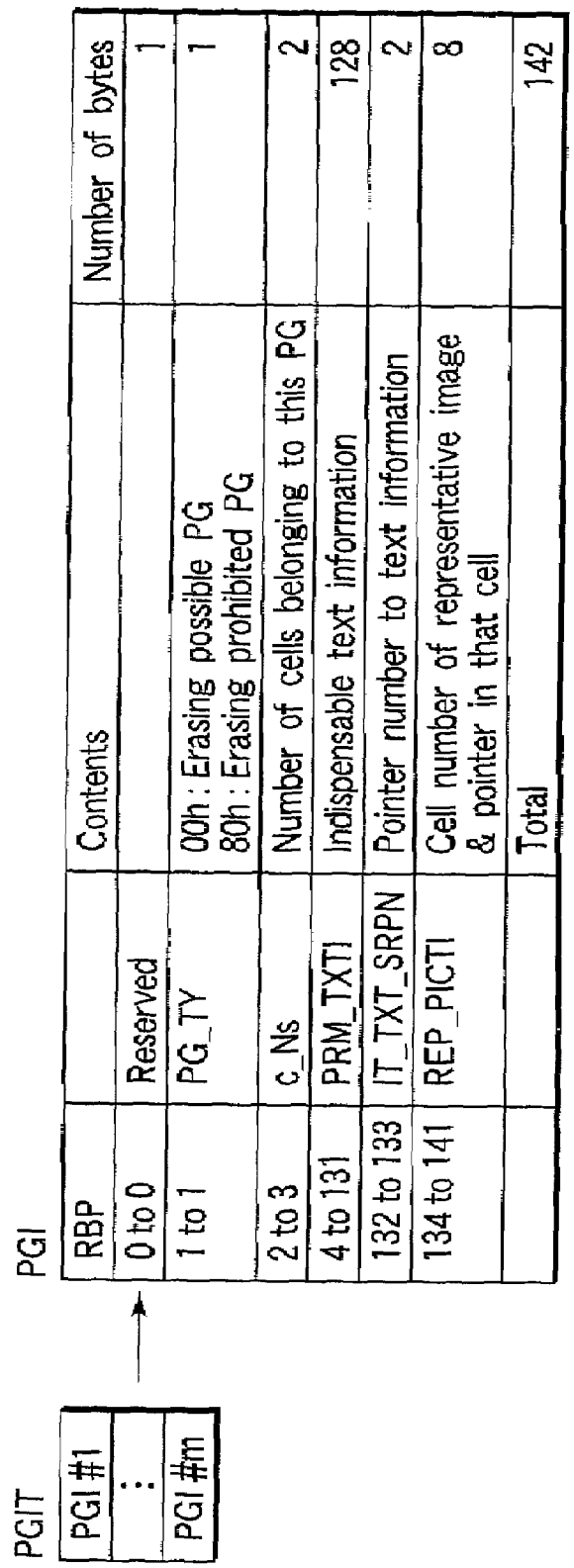
FIG. 6 is a figure showing, in further detail, contents of a program chain information table (PGCIT) in program chain information (PGCI).

FIG. 6 is a figure showing the contents of the program chain information table (PGCIT) in the program chain information (PGCI).

A program type (PG_TY) showing whether the program corresponding to the program chain can be erased or not, the number of cells in the program, primary text information (PRM_TXTI) to be described in the program, a pointer number (IT_TXT_SRPN) to the text information, and representative image information (REP_PICTI=the cell number and the pointer in that cell) are described in the program chain information.

Here, returning to FIG. 1, the recording/playback device which handles the standardized disks described above will be described.

The playback processing at the recording/playback device shown in FIG. 1 is carried out in accordance with the program chain information (PGCI) showing the playback procedure of the program. The PGCI can designate a plurality of programs (PG). Cell information (CI) is defined in the PGCI. A cell entry point (C_EPI) is designated by the CI, and the VOB to be played back is specified. Further, a special PGC for playing back in the recorded order is called an original PGC, and the information of the original PGC is recorded as ORG_PGCI. Moreover, the attribute information of the video data at this time (resolution information, aspect information, audio attribute information, and the like) are recorded in stream information (STI) in the VMGI. Further, the above-described pack is a minimum unit which carries out the data transfer processing. The minimum unit of logical processing is a cell unit. Namely, the logical processing is carried out in cell units. Accordingly, when recording is carried out, recording signals are converted to a format which matches the above-described format.

The recording/playback device has, as the main structure thereof, a hard disk drive device 2001, and a disk drive 35, an encoder section 50, a decoder section 60, and a microcomputer block 30. The disk drive 35 rotationally drives an optical disk 1001 as an information storage medium which can form video files, and carries out reading and writing of information from and onto the optical disk 1001. The encoder section 50 forms the recording side. The decoder section 60 forms the playback side. The microcomputer block 30 controls the operation of the body of the device.

The encoder section 50 is provided with an ADC (analog digital converter) 52, an encoder group 53, a formatter 56, and a buffer memory 57. The encoder group 53 includes a V (video) encoder, an A (audio) encoder, and an SP (sub-image) encoder. The formatter 56 makes outputs of the respective encoders be in predetermined formats.

An external analog video signal+an external analog audio signal from an AV input section 42, or an analog video signal+an analog audio signal from a TV (television) tuner 44 are inputted to the ADC 52.

The ADC 52 digitizes the inputted analog video signal by, for example, a sampling frequency of 13.5 MHz and a number of quantization bits of 8 bits. Namely, a brightness component Y, a color difference component Cr (or Y−R), and a color difference component Cb (or Y−B) are respectively quantized by 8 bits.

In the same way, the ADC 52 digitizes the inputted analog audio signal by, for example, a sampling frequency of 48 kHz and a number of quantization bits of 16 bits.

Note that, when a digital video signal and a digital audio signal are inputted to the ADC 52, the ADC 52 through-passes the digital video signal and the digital audio signal. Further, the ADC 52 may carry out a jitter reducing processing and a sampling rate changing processing on the digital video signal and the digital audio signal without altering the contents thereof. However, when the sampling frequencies or the like of the digital video signal and the digital audio signal are different, the ADC 52 carries out a conversion processing on the digital video signal and digital audio signal.

The digital video signal outputted from the ADC 52 is transmitted to the formatter 56 via the V encoder. Further, the digital audio signal outputted from the ADC 52 is transmitted to the formatter 56 via the A encoder.

On the basis of the MPEG2 or MPEG1 standard, the V encoder converts the inputted digital video signal to a digital signal compressed by a variable bit rate. Further, on the basis of the MPEG or AC-3 standard, the A encoder converts the inputted digital audio signal to a digital signal compressed by a fixed bit rate or a digital signal of a linear PCM.

Here, a case in which a supplementary image signal is inputted from the AV input section 42 is conceived. For example, a case in which a signal from a DVD video player having an independent output terminal of the supplementary image signal is inputted from the AV input section 42 is conceived. Or, a case in which a DVD video signal having such a data structure is broadcast, and is received at the TV tuner 44 is conceived. The supplementary image signal (supplementary image pack) in the DVD video signal is inputted to the SP encoder. The supplementary image signal inputted to the SP encoder is arranged to a predetermined signal format, and transmitted to the formatter 56.

While the formatter 56 is using the buffer memory 57 as a work area, the formatter 56 carries out predetermined signal processings on the video signal, audio signal, supplementary image signal, and the like which are inputted. In this way, recording data, which matches the format (file structure) as described above in FIG. 3 and FIG. 4, is outputted to a data processor 36.

The information encoded in the encoder section 50 and the management information prepared in the encoder section 50 are supplied to the hard disk device 2001 via the data processor 36, and may be recorded onto the hard disk. The information recorded on the hard disk may be recorded on the optical disk 1001 via the data processor 36 and the disk drive 35. Moreover, the information encoded in the encoder section 50 and the management information prepared in the encoder section 50 may be recorded onto the optical disk 1001 via the data processor 36 and the disk drive 35.

Further, when the information recorded on the hard disk of the hard disk device 2001 is the same as the data format of the optical disk 1001, the information in the hard disk is not encoded, and is recorded as it is onto the optical disk.

Further, when the information recorded on the hard disk of the hard disk device 2001 is different from the data format of the optical disk 1001, the information read out from the hard disk is encoded in the encoder section 50, and is recorded onto the optical disk 1001.

Here, standard encoding processing contents for preparing the recording data onto the optical disk 1001 will be briefly described. When the encoding processing starts in the encoder section 50, the parameters necessary for encoding processing the video (main image) data and the audio data are set. By using the set parameters, the main image data is subjected to pre-encoding processing. In this way, the distribution of the amount of codes appropriate for the set average transfer rate (recording rate) is calculated. On the basis of the code amount distribution obtained by the pre-encoding processing, the encoding processing of the main image data is executed. At this time, the encoding processing of the audio data is executed at the same time. In the same way, the parameters necessary for encoding processing the supplementary image data are set, and supplementary image data encoding-processed is prepared.

The main image data, the audio data, and the supplementary image data which have been subjected to encoding processing are combined and converted into the structure of a video object set VOBS. The cell is set as the minimum logical unit of the main image data (video data), and cell information as described in FIG. 5 is prepared. Next, the structure of the cell which forms the program chain PGC, and the attribute information and the like of the main image, the supplementary image, and audio are set, and a VMG file including various information is prepared. The information obtained at the time of encoding the respective data are used for a portion of the attribute information.

The main image data, the audio data, and the supplementary image data which have been subjected to encoding processing are subdivided into packs (FIG. 3) of a constant size (2048 bytes). Note that time stamps such as a PTS (presentation time stamp) showing a playback time, or a DTS (decoding time stamp) showing a decoding time, or the like are appropriately described in the packs. As for the PTS of the supplementary image, a time arbitrarily delayed more than the PTS of the main image data or the audio data in the same time period of playback may be described.

Further, the RDI pack (which corresponds to a navigation pack) is disposed at the head of the video object unit VOBU such that playback in the order of the time codes of the respective data is possible, and the respective cells are arranged. In this way, the video object VOB to be composed of a plurality of cells is structured. The video object set VOBS is recorded in the movie video file as a program by collecting one or more video objects VOB.

Note that, when the DVD playback signal is digitally copied from a DVD video player, because the contents of the above-described cells, program chain, management table, time stamps, and the like are determined from the start, there is no need to prepare them again.

The components which record information on the optical disk 1001 and which play back information from the optical disk 1001 are the disk drive 35, the data processor 36, a temporary storage section 37, and an STC (system time counter or system time clock) 38.

The temporary storage section 37 buffers a fixed amount of data among the data (the data to be outputted from the encoder section 50) to be written on the optical disk 1001 via the data processor 36 and the disk drive 35. Further, the temporary storage section 37 buffers a fixed amount of data among the data (the data to be inputted to the decoder section 60) played back from the optical disk 1001 via the disk drive 35 and the data processor 36. The disk drive 35 has a rotary control system, a laser driving system, an optical system, and the like.

For example, when the temporary storage section 37 is composed of a semiconductor memory (DRAM) of 4 Mbytes, the temporary storage section 37 can buffer about 8 seconds of recording data or playback data at a recording rate of an average of 4 Mbps (bits per second).

Further, when the temporary storage section 37 is composed of an EEP (electrically erasable and programmable) ROM (=flash memory), the temporary storage section 37 can buffer about 30 seconds of recording data or playback data at a recording rate of an average of 4 Mbps.

Moreover, when the temporary storage section 37 is composed of a microminiature HDD (hard disk drive) of 100 Mbytes, the temporary storage section 37 can buffer 3 minutes or more of recording data or playback data at a recording rate of an average of 4 Mbps.

When the remaining capacity of the optical disk 1001 is used up in the midst of recording onto the optical disk 1001, during the time until a new disk is prepared, the picture may instead be temporarily recorded in the temporary storage section 37. Of course, the picture can temporarily be recorded in the hard disk device 2001.

When the disk drive 35 is a high speed drive (more than double speed), the data excessively read out can be temporarily stored in the temporary storage section 37. If the data read out from the optical disk 1001 are buffered at the temporary storage section 37, there is a countermeasure to vibration shock. Namely, if a reading error is temporarily caused due to an optical head (not shown) being shifted by vibration shock, due to the playback data buffered at the temporary storage section 37 being outputted, it is possible to not interrupt the playback image.

The data processor 36 supplies the DVD recording data outputted from the encoder section 50 to the disk drive 35 in accordance with the control of the microcomputer block 30. Further, the data processor 36 fetches the DVD playback signal played back from the optical disk 1001, from the disk drive 35 in accordance with the control of the microcomputer block 30. Moreover, the data processor 36 rewrites the management information recorded on the optical disk 1001, and deletes the data (file or video project) recorded on the optical disk 1001.

The microcomputer block 30 is equipped with an MPU (micro processing unit) or a CPU (central processing unit), and a ROM in which a control program and the like are written, and a RAM for providing a work area necessary for executing programs. In accordance with the control program stored in the ROM, the MPU of the microcomputer block 30 uses the RAM as a work area, and carries out defective place detection, unrecorded region detection, recording information recording position setting, UDF recording, AV address setting, and the like.

Further, the microcomputer block 30 has an information processing section necessary for controlling the whole system. For example, the microcomputer block 30 is equipped with a copy information detecting/setting section, a directory detecting section, a VMG management information preparing section, a remaining capacity amount detecting section, a recording/playback control section, a recording reservation information processing section, a recording capacity detecting section, and a recording bit rate computing section. The copy information detecting/setting section detects copy information which shows, for the target video/audio signal to be recorded, that copying is prohibited, or duplicate copying is prohibited, or there are no restrictions on copying, or the like. The remaining capacity detecting section detects the remaining capacity of the recording destination (optical disk 1001 or HDD 2001). The recording operation control section controls the recording operation based on the recording reservation information, or the like. The recording reservation information processing section holds the received recording reservation information, and analyzes the recording reservation information, and controls the respective portions. The recording capacity detecting section detects the recording capacity required by the target video/audio signal to be recorded. The recording bit rate computing section computes the optimal recording bit rate in accordance with, for example, the remaining capacity.

Among the results of the processings carried out at the microcomputer block 30, the contents to be notified to a user are displayed at a display section 48 of the DVD video recorder. Or, the contents are OSD (on screen display) displayed on a monitor display.

Note that the timings at which the disk drive 35, the data processor 36, the encoder section 50, and the decoder section 60 are controlled by the microcomputer block 30 are based on the time data from the STC 38. The operations of recording and playback are usually executed synchronously with the time clock from the STC 38. The processings other than the operations of recording and playback may be executed at timings independent from the STC 38.

The decoder section 60 is equipped with a separator 62, a memory 63, a decoder group 64, and a video processor 66. The separator 62 separates and removes respective packs from image information having the pack structure as shown in FIG. 3. The memory 63 is used in separating the packs and at the time of executing other signal processings. The decoder group 64 is equipped with a V decoder, an SP decoder, and an A decoder. The V decoder decodes the main image data (the contents of the video pack) separated by the separator 62. The SP decoder decodes the supplementary image data (the contents of the supplementary image pack) separated by the separator 62. The A decoder decodes the audio data (the contents of the audio pack) separated by the separator 62. The video processor 66 appropriately synthesizes supplementary image data to be obtained from the SP decoder with the main image data to be obtained from the V decoder, and superposes a menu, a highlight button, subtitles, and other supplementary images on the main image, and outputs the image.

The output of the video processor 66 is inputted to a video mixer 71. The video mixer 71 synthesizes text data. Further, the line which directly takes in the signal from the TV tuner 44 and the A/V input section 42 is also connected to the video mixer 71. A frame memory 72 used as a buffer is connected to the video mixer 71. When the output of the video mixer 71 is digital, the output is outputted to the exterior via an interface (I/F) 73, and when the output of the video mixer 71 is analog, the output is outputted to the exterior via a DAC 74.

When the output of the A decoder is digital, the output is outputted to the exterior via an interface (I/F) 75. When the output of the A decoder is analog, the output is, analog-converted at a DAV 77 to be outputted to the exterior via a selector 76. When the selector 76 directly monitors signals from the TV tuner 44 and the A/V input section 42, the selector 76 can select the output from the ADC 52 by the select signal from the microcomputer block 30. The analog audio signals are supplied to an external component (a multichannel stereo device having 2 channels to 6 channels) (not shown).

A brief description of a flow of the video signals at the recording/playback device shown in FIG. 1 is as follows.

First, the inputted AV signal is digitally converted at the ADC 52. The video signals are inputted to the V encoder, the audio signals are inputted to the A encoder, and character data such as character broadcasting and the like is inputted to the SP encoder. The video signals are MPEG compressed, and the audio signals are AC3 compressed or MPEG audio compressed, and the character data is run-length-compressed.

The packed compressed data from the respective encoders are made into packets so as to be 2048 bytes, and are inputted to the formatter 56. The formatter 56 packs the respective packets, and multiplexes them, and transmits them to the data processor 36.

Further, the formatter 56 prepares an RDI pack on the basis of the aspect information, and places the RDI pack at the head of the video object unit (VOBU). The data processor 36 attaches error correction data to 16 packs, and forms ECC (Error Correction Code) block data. The ECC block data is recorded onto the optical disk 1001 via the disk drive 35. However, when the disk drive 35 is in a busy state such as it is currently seeking or is track jumping or the like, during the period of time until the busy state is dissolved, the ECC block data is stored at the temporary storage section 37.

Further, the formatter 56 prepares respective bracketing information during recording, and transmits the bracketing information to the MPU of the microcomputer block 30 periodically (information at the time of interrupting the head of GOP or the like). The bracketing information is information such as a number of packs of the VOBU, an end address of an I picture from the head of the VOBU, a playback time of the VOBU, and the like.

The aspect information is transmitted to the MPU at the time of starting recording, and the MPU prepares VOB stream information (STI). The VOB stream information includes resolution data, aspect data, and the like. At the time of playback, respective decoder sections carry out various initial settings on the basis of the VOB stream information.

Further, in the DVD for recording/playback, the video file is one file per one disk. A real time recording/playback device which processes a DVD for recording/playback must continue playing back uninterruptedly, even at the time of accessing (seeking) data. Therefore, the minimum continuous unit called CDA (continuous data area) is determined.

The CDA is advantageously a unit of ECC block data. Therefore, the size of the CDA is a multiple of 16 sectors. In the file system, recording is carried out in CDA units. However, when there are no empty regions of the CDA size in the disk, a short sector used by another file is permitted to enter in to the CDA. In this way, recording can be carried out in CDA units.

Figure 7:
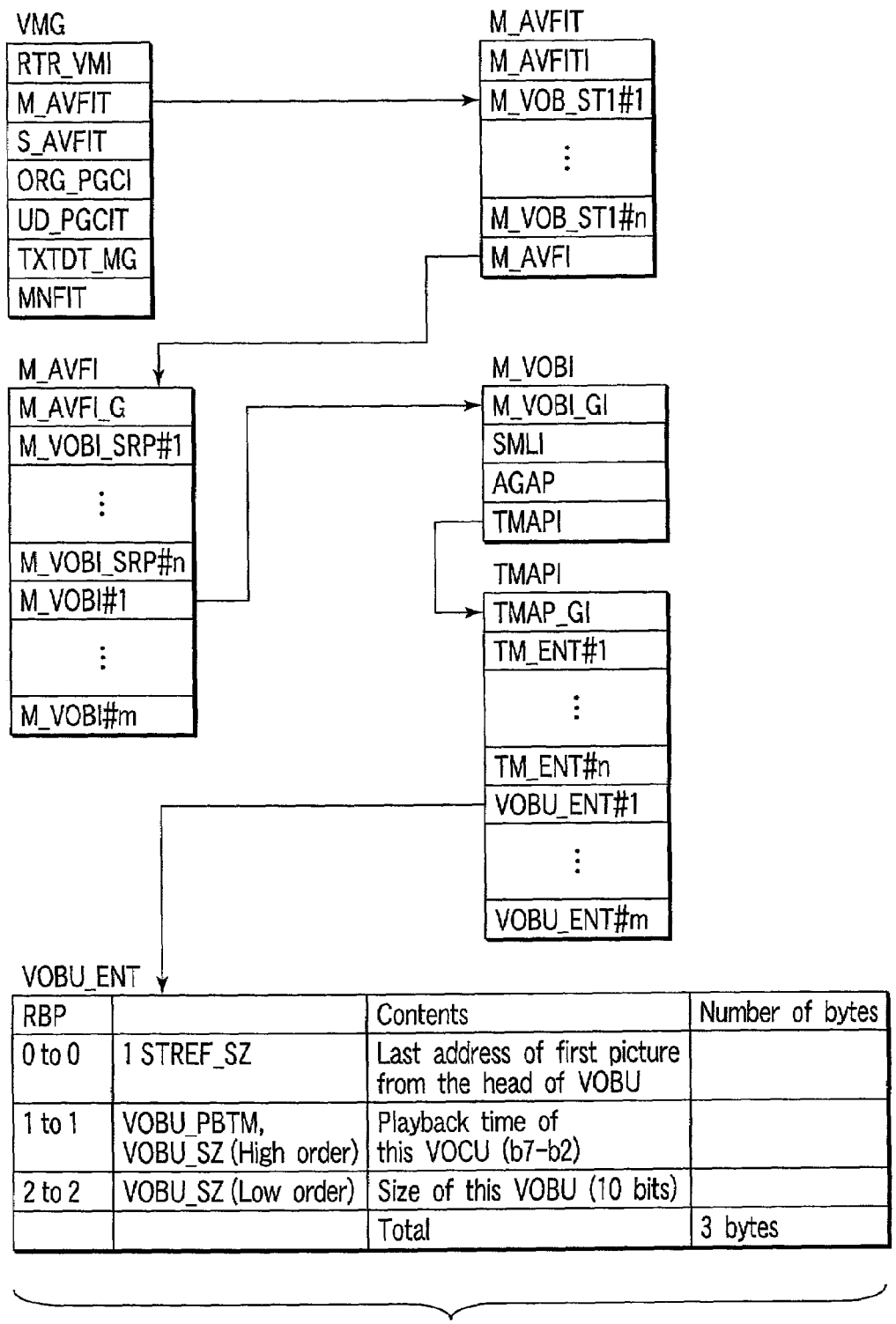
FIG. 7 is a figure hierarchically showing a movie AV file information table (M_AVFIT) in the video manager (VMG)

FIG. 7 is a figure hierarchically showing a movie AV file information table (M_AVFIT) in the video manager (VMG). The M_AVFIT includes stream information (M_VOB_STI). The M_VOB_STI includes a number of the recorded VOBs (programs), stream numbers of the audio or the supplementary images corresponding to the respective VOBs, and attributes of the respective VOBs (television system, aspect ratio, and the like). Moreover, M_AVFI includes general information, individual information, and time map information (TMAPI) of the VOBU in the VOB. The time map information is used at the time of special playback. The general information is information showing that the VOB can be played back or has been temporarily erased, and is information regarding the date and time when the VOB was recorded (recording time). The individual information is system clock information serving as information (SMLI) for continuously playing back the search pointers of the respective VOBs and a plurality of VOBs.

A recording rate automatic setting function is provided in the system of the present invention. In accordance with this function, an optimal recording rate (recording bit rate) in accordance with the remaining capacity of an information recording medium having a plurality of recording surfaces, is set.

As shown in FIG. 1, a copy information detecting/setting section is provided at the microcomputer block 30 of the recording/playback device. The copy information detecting/setting section detects, for example, (1) from a signal which has been multiplexed on the horizontal blanking of a broadcast signal, that copying of the contents included in the broadcast signal is permitted without any restrictions (there is no restriction of duplicate copying prohibition), or is permitted only one time (there is the restriction of duplicate copying prohibition). Or, the copy information detecting/setting section detects (2) whether or not the video signal itself included in the broadcast signal is scrambled. If the video signal is scrambled, copying is prohibited. Further, both of the above-described systems (1) and (2) may be adopted. The copy information detecting/setting section stores copying prohibition information on the basis of the above-described results of detecting.

The encoder section 50 has a synchronization signal detecting section 55. The synchronization signal detecting section 55 detects, from the signals to be provided from the AV input section 42, the horizontal and vertical synchronization signals of the image signal, and transfers information showing the presence/absence of the synchronization signal to the microcomputer block 30.

Figure 8:
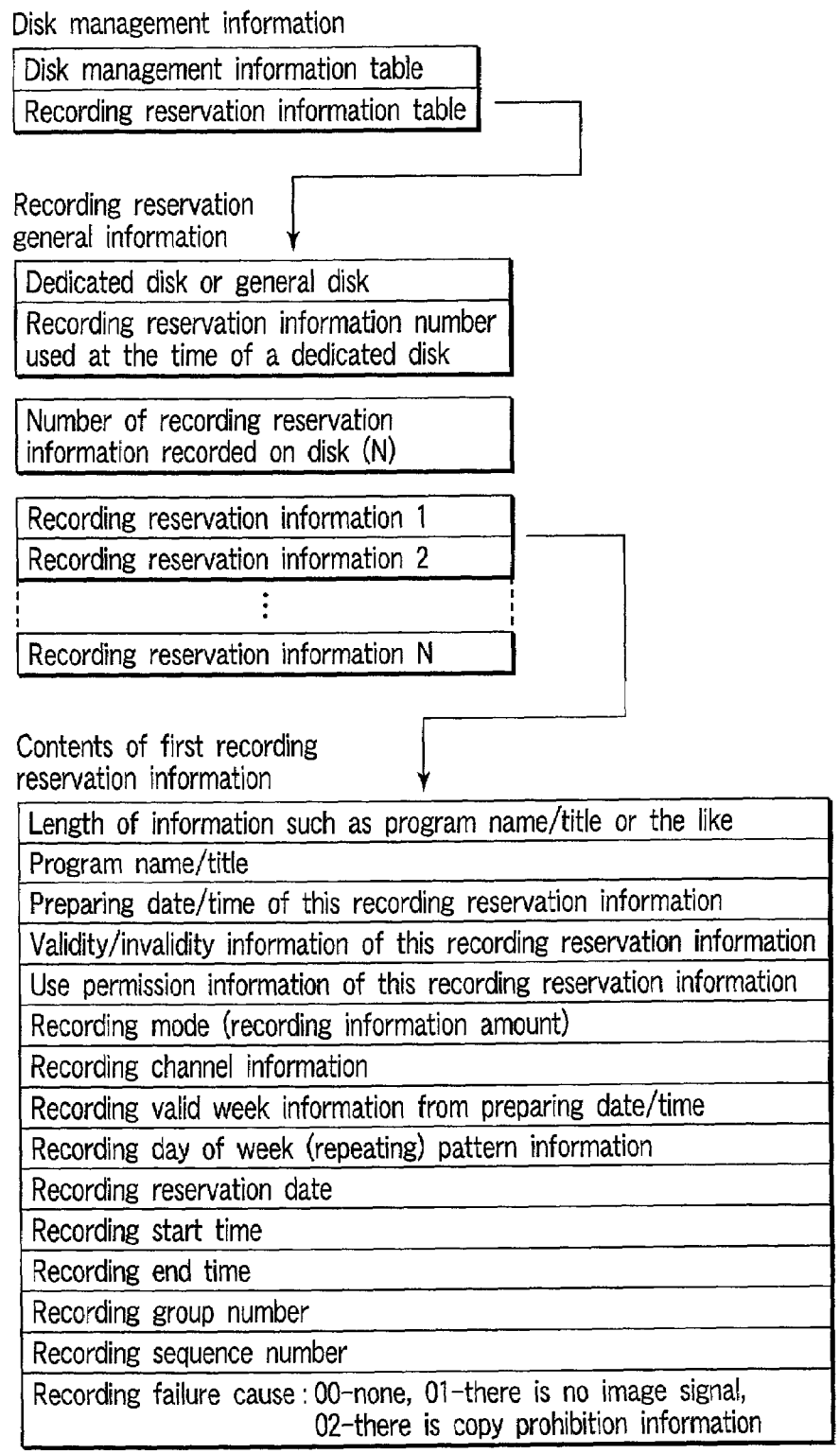
FIG. 8 is a figure showing an example of disk management information.

Areas in which the disk management information is stored are secured at the memory or the hard disk of the microcomputer block 30, or at both. FIG. 8 is a figure showing an example of the disk management information.

In the disk management information, there are a disk management information table and a recording reservation information table. At the recording reservation information table, recording reservation general information is described on each disk (for example, for each disk identification number). The recording reservation general information includes an identification code indicating a dedicated disk or a general disk. When there is no identification code in the recording reservation general information, the disk is judged to be a general disk. The dedicated disk is, for example, a disk for recording continuous programs to be broadcast at a specific time every week or from Monday to Friday. The recording reservation information number, the number of recording reservation information recorded on the disk, and the recording reservation information are described on the DVD-RAM on which the identification code indicating a dedicated disk is recorded. Further, recording reservation information set by the user is recorded on the general disk as well. This recording reservation information is read out from the general disk, and the read recording reservation information is temporarily held at the work RAM.

As the recording reservation information, there are the length of information such as the program name/title and the like, the program name/title, the preparation date/time of this recording reservation information, validity/invalidity information of this recording reservation information, usage permission information of this recording reservation information, the recording mode (the amount of recording information), the recording channel information, recording validity weekly information from date and time of the preparation, recording day of the week (repetition) pattern information, the recording reservation date, the recording start time, the recording end time, the recording group number, the recording sequence number, the cause of recording failure, and the like. Among the recording reservation information, information which designates a target program for which recording is desired is inputted via a key input section 47 shown in FIG. 1.

As codes indicating the cause of recording failure, for example, "00" denotes that there are no causes for recording failure, "01" denotes that there are no audio image signals, and "02" denotes that copying is prohibited.

Storage space of the above-described recording reservation information may be a text information entry section provided as a DVD standard. Or, storage space may be secured independently at the recording/playback device of the present invention. Or, a storage memory may be readied independently.

Figure 9:
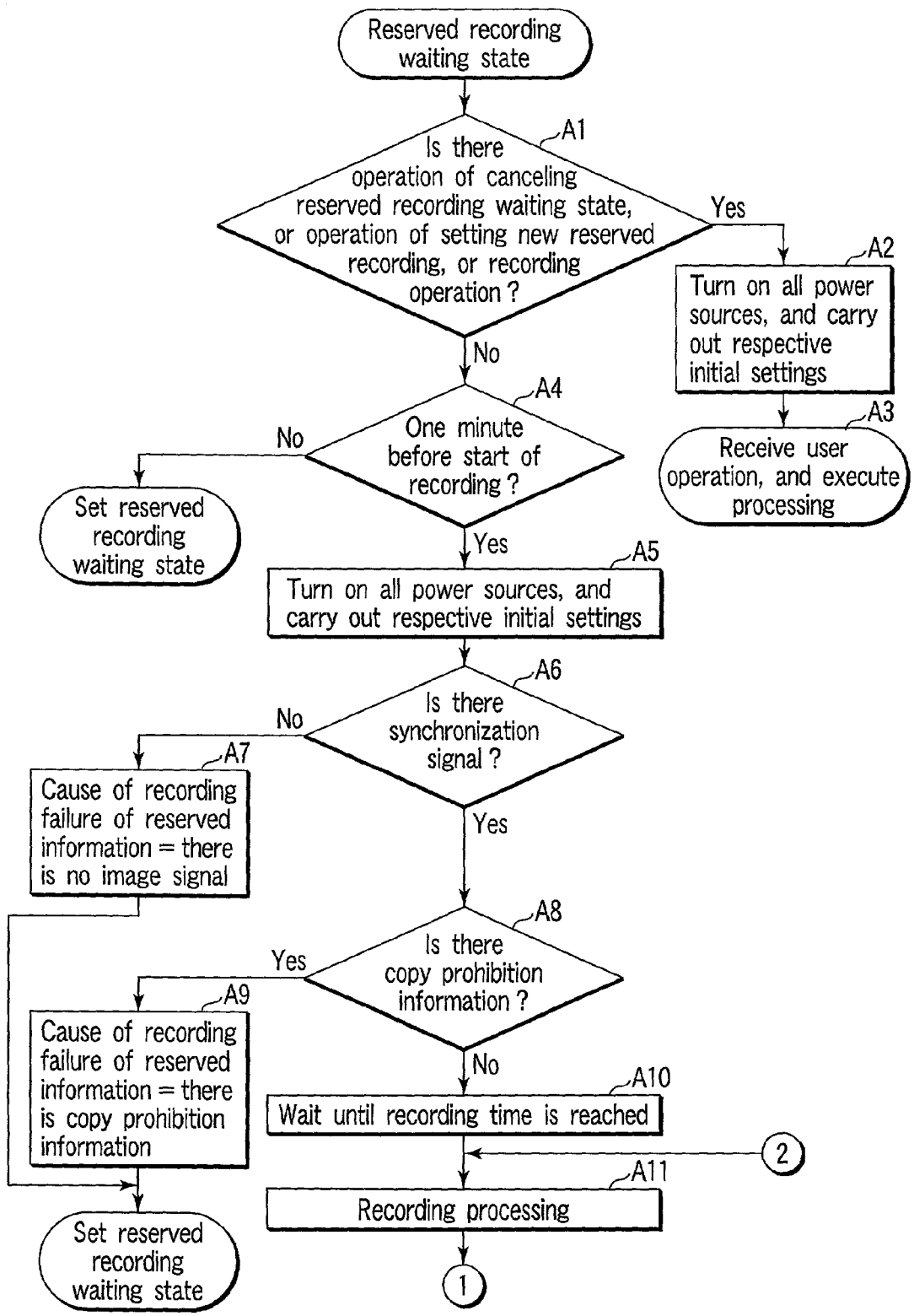
FIG. 9 is a flowchart showing a first part of a recording processing which handles reserved recording.
Figure 10:
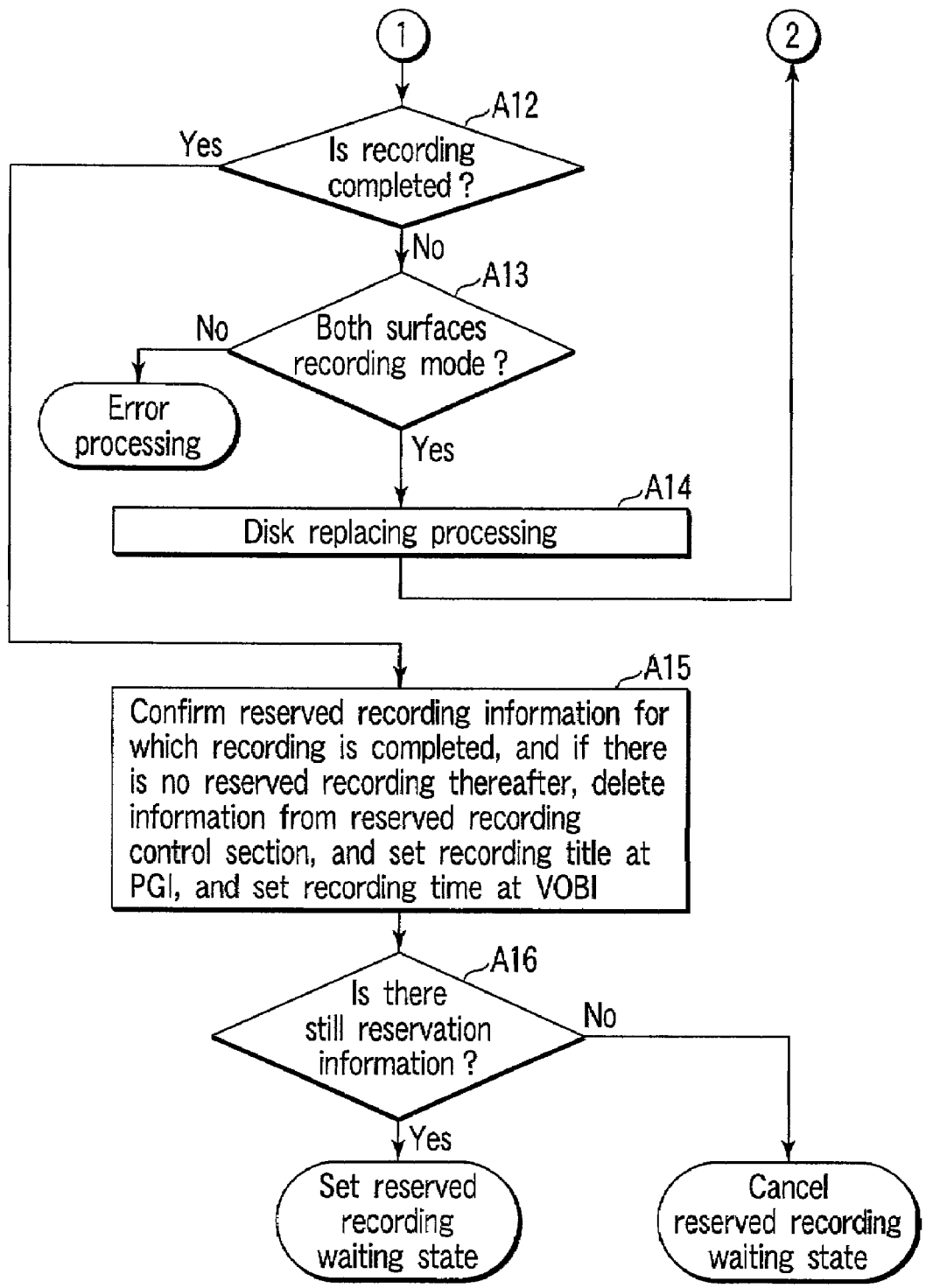
FIG. 10 is a flowchart showing a second part of the recording processing which handles reserved recording.

FIG. 9 and FIG. 10 are flowcharts showing the recording processing which handles reserved recording.

It is assumed that the device is in the state of waiting for reserved recording, for example. Namely, it is assumed that the HDD and the disk drive are in the state of getting ready for the recording operation. If a canceling operation of the reserved recording waiting state, a new recording reservation setting operation, or a recording operation, or the like is carried out by the user (step A1, YES), all power sources are turned on, and initial settings of the respective portions are carried out (step A2). The user operations are received, and the processings corresponding to the received operations are executed (step A3).

Next, a case in which there are none of the above-described operations (step A1, NO) will be described. The device carries out comparison of the information of an internal clock circuit and the reservation time (recording start time information), and when one minute before the recording start time is reached (step A4, YES), all the power sources of set are turned on, and the initial settings of the respective portions are carried out (step A5).

When a DVD-RAM disk is loaded into the device, a disk detection signal by a disk detecting sensor is provided to the system control section. Usually, when an initialized disk is loaded and the rotational speed of the loaded disk reaches a desired speed, the management information is read, and the read management information is stored in the RAM of the system control section. This series of operations requires several tens of seconds (e.g., 30 seconds).

Before recording starts, it is judged whether or not there is a synchronization signal in the input signal (step A6). If there is no synchronization signal immediately before the recording start time, it may be judged that there is no synchronization signal. If there is no synchronization signal even when a predetermined period of time has passed from the recording start time, it may be judged that there is no synchronization signal. When there is no synchronization signal (step A6, NO), "01" is recorded as the cause of recording failure in the contents of the recording reservation information shown in FIG. 8 (step A7). Namely, "no image signal" is recorded as the cause of recording failing. Thereafter, the routine moves onto a reserved recording waiting state.

If there is a synchronization signal (step A6, YES), the presence or absence of copy prohibit information is confirmed (step A8). If there is copy prohibit information (step A8, YES), "02" is recorded as the cause of recording failure in the contents of the recording reservation information shown in FIG. 8 (step A9). Namely, "there is copy prohibit information" is recorded as the cause of the recording failing. Thereafter, the routine moves onto a reserved recording waiting state.

If there is a synchronization signal (step A6, YES) and there is no copy prohibit information (step A8, NO), the routine waits until it becomes the recording start time (step A10). When it becomes the recording start time, recording processing is started (step A11).

When before recording is completed (step A12, NO), the recording capacity of the disk is insufficient and the both surfaces mode in which both surfaces of the disk can be recorded cannot be implemented (step A13, NO), there is an error. When the both surfaces mode can be implemented (step A13, YES), disk replacement processing is carried out (step A14), and the recording processing is continued.

When recording is completed (step A12, YES), the reserved recording information for which recording has been completed is confirmed. If there is no further reserved recording, the reserved recording information is erased, and the recording title is set in the PGI and the recording time is set in the VOBI (step A15). In this way, when the recorded contents in the disk are played back later, the recording title and the recording time can be displayed, and the convenience of use by the user improves. Further, if there is recording reservation information (step A16, YES), the routine enters into the reserved recording waiting state. If there is no recording reservation information (step A16, NO), the reserved recording waiting state is cancelled.

Figure 11:
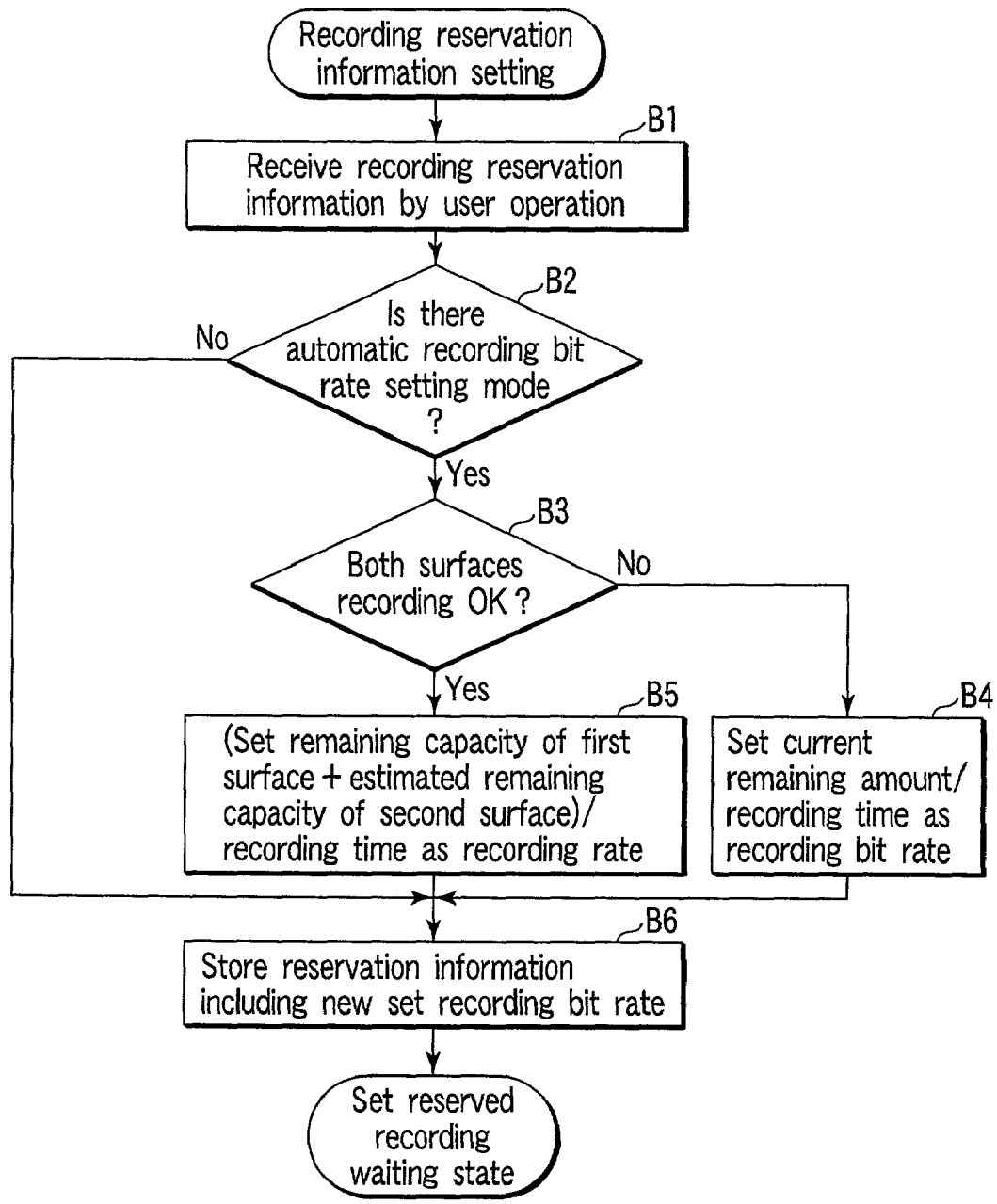
FIG. 11 is a flowchart explaining setting of recording reservation information.

FIG. 11 is a flowchart for explaining setting of the recording reservation information.

When the routine enters into the recording reservation information setting mode, the recording reservation information by the user operation is received (step B1). For example, by pressing a recording reservation button provided on a remote controller, the routine can be made to move into the recording reservation setting mode.

As the recording reservation information, there is information as that illustrated in FIG. 8. The recording mode and the recording time are shown in the recording reservation information. The storage capacity required for recording differs in accordance with the recording mode (recording bit rate). This recording/playback device is equipped with an automatic recording bit rate setting mode which automatically changes the recording bit rate in accordance with the remaining capacity of a disk. If the device is a recording/playback device which is not equipped with an automatic recording bit rate setting mode (step B2, NO), the recording reservation information is stored as it is (step B7). The recording mode at this time is a recording mode set in advance, for example, the standard mode.

This recording/playback device is equipped with an automatic recording bit rate setting mode (step B2, YES), the routine moves into the processing of setting the recording bit rate in accordance with the remaining capacity of the disk. Information showing whether or not recording onto both surfaces thereof is possible is recorded on the disk. The recording/playback device reads out the information showing whether recording onto both surfaces is possible or not, and judges whether or not recording onto both surfaces is possible.

If the disk is a disk at which recording on both surfaces is not possible (step B3, NO), the current disk remaining capacity (disk remaining capacity of a single surface) is divided by the recording time, and the recording bit rate is calculated, and the calculated recording bit rate is set (step B4). Namely, the reservation information including the recording bit rate newly set is stored (step B6).

If the disk is a both surfaces recordable disk (step B3, YES), the entire capacity of both surfaces of the disk is calculated, and the calculated recording entire capacity is divided by the recording time so as to calculate the recording bit rate, and the calculated recording bit rate is set (step B5). Namely, reservation information including the newly set recording bit rate is stored (step B6). The entire capacity of a disk is a capacity in which the remaining capacity of a first surface which can be currently accessed and the estimated remaining capacity of a second surface are added together. The estimated remaining capacity of the second surface is the same as the entire capacity of the first surface. Or, the estimated remaining capacity of the second surface is half of the entire capacity of the first surface (i.e., the estimated remaining capacity of the second surface is at least half of the entire capacity of the first surface). Note that the recording bit rate is computed by a recording bit rate computing section.

As recording bit rate modes, there are an SP mode (5.0 Mbps), an LP mode (2.4 Mbps), a manual mode, a just recording mode, and the like. The just recording mode is a mode in which the recording bit rate is calculated from the recording time and the remaining capacity and recording is carried out such that all the remaining capacity is just used up. This just recording mode corresponds to the recording rate automatic setting function of the present invention.

The capacity of a recording program is recorded in the recording reservation information. If the capacity of the recording program is subtracted from the entire capacity of the disk checked in advance, the remaining capacity (free capacity) can be calculated. Further, the playback time of the recorded program is recorded in the DVD management information. If all of the playback times of the video objects recorded on the disk are added together, the recorded capacity of the disk is known. If the recorded capacity is subtracted from the entire capacity of the disk checked in advance, the remaining capacity can be calculated. Moreover, the capacity which will be used by future recording can be estimated from the recording time and the recording bit rate which are included in the recording reservation information. By using the capacity used by future recording, the remaining capacity of the disk can be calculated.

Here, the features of the recording/playback device of the present invention will be summarized.

First, time information needed for reserved recording is detected from the recording reservation information by a recording reservation information processing section of the microcomputer block 30. Disk type information is recorded in a disk management information table in the disk management information shown in FIG. 8. The disk type information is information showing that the disk corresponds to which of a single surface type, a both surfaces type, or a plural layers type. Disk management information read from the disk is stored in a work RAM. On the basis of the disk type information in the disk management information stored in the work RAM, the microcomputer block 30 judges the type of the disk. When it is judged that an optical disk corresponds to the both surfaces type or the plural layers type, a first remaining capacity at a first surface (for example, a front surface) or a first recording layer which is firstly recorded is detected by a remaining capacity detecting section of the microcomputer block 30. Further, the remaining capacity detecting section judges that the entire recording capacity of the first recording surface or the first recording layer and the entire recording capacity of a second recording surface (for example, a back surface) or a second recording layer are the same, and judges that at least half of the entire recording capacity of the second recording surface or the second recording layer is the second remaining capacity. At this time, the entire recorded capacity of the second recording surface or the second recording layer may be judged to be the second remaining capacity. Further, the remaining capacity detecting section judges the sum of the first and second remaining capacities to be the current entire remaining capacity. On the basis of the current entire remaining capacity and the time necessary for reserved recording, a recording bit rate computing section of the microcomputer block 30 sets the recording bit rate. On the basis of the set recording bit rate and recording reservation information, a recording/playback operation control section of the microcomputer block 30 makes a target video/audio signal be recorded.

Further, in the present invention, during the time when the recording surface (or the recording layer) of the optical disk is changed from the first recording surface (or the first recording layer) to the second recording surface (or the second recording layer), the target video/audio signal is temporarily stored in the HDD 2001 at the same rate as the recording bit rate recorded on the first recording surface (or the first recording layer). The video/audio signal temporarily stored in the HDD 2001 is recorded onto the second recording surface (or the second recording layer) at a predetermined timing.

Further, when the recording surface of the optical disk is changed to the second recording surface (or the second recording layer), the actual remaining capacity of the second recording surface (or the second recording layer) is detected, and a new recording bit rate can be calculated and set again. In this case, the amount of the capacity which is temporarily stored in the HDD 2001 may be subtracted from the actual remaining capacity of the second recording surface (or the second recording layer), and a new recording bit rate may be calculated and set again.

For example, the recording capacity necessary for recording is calculated by the following method (1) or (2).

(1) The reservation time (the period of time from the start of recording to the end of recording) for each program which is recorded in the recording reservation information table is added together, and the capacity needed for recording is calculated.

(2) At the current point in time, the capacity needed for recording is calculated by only the reservation time of the program to recorded next.

When the disk which is currently loaded is designated as a dedicated disk for recording a specific program, the capacity needed for recording is calculated by above method (2). Further, when the disk is not a dedicated disk, the capacity needed for recording is calculated by above method (1). The capacity needed for recording is calculated, and the current remaining capacity is calculated at the time of loading the disk, and the current remaining capacity and the capacity needed for recording are compared. When the current remaining capacity is extremely small, a warning display may be carried out.

Herein, a method has been described in which the results of adding the actual remaining capacity of one recording surface (or recording layer) and the estimated remaining capacity of the other recording surface (or recording layer), is estimated to be the entire remaining capacity, and the recording bit rate is determined on the basis of the estimated entire remaining capacity, and recording is started. This method has even considered, after recording on the one recording surface (or recording layer) is completed, detecting the actual remaining capacity of the other recording surface (or recording layer), and again setting the recording bit rate. Moreover, in order to determine an appropriate recording bit rate, the results of adding the actual remaining capacity of the one recording surface (or recording layer) and the actual remaining capacity of the other recording surface (or recording layer) can be used as the actual entire remaining capacity, a recording bit rate can be determined on the basis of the actual entire remaining capacity, and recording can be started. In this case, if the disk is a both surfaces type disk, before recording starts, for example, the disk is rotated by a disk changer section 300, and the actual remaining capacities of both surfaces are checked. If the disk is a two layer type disk, before recording starts, the focus is switched, and the actual remaining capacities of both layers are checked. In accordance with this method, a more exact remaining capacity can be grasped, and a recording bit rate which just fits the recording time can be set.

Figure 12:
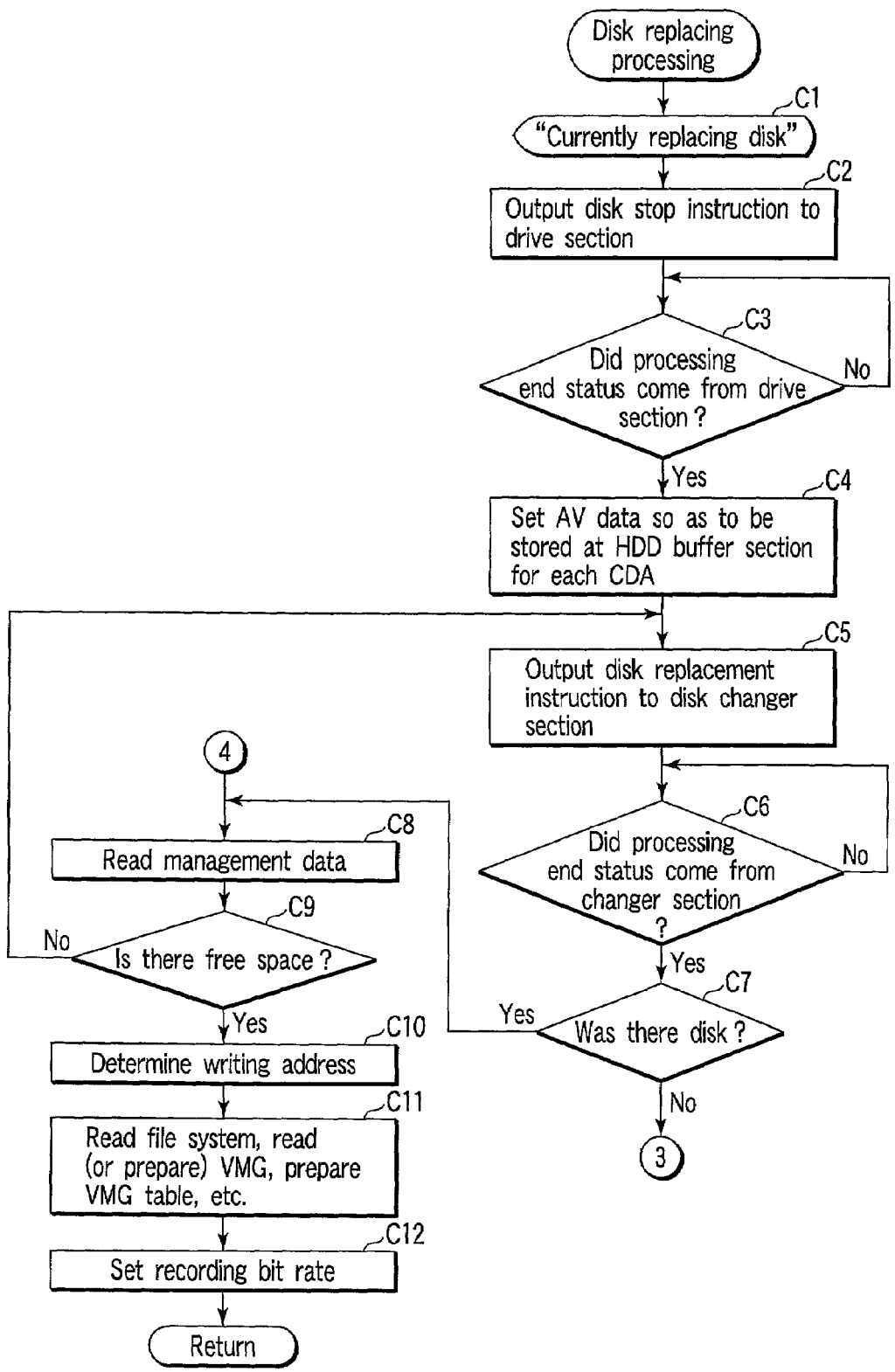
FIG. 12 is a flowchart showing a first part of a disk replacement processing.
Figure 13:
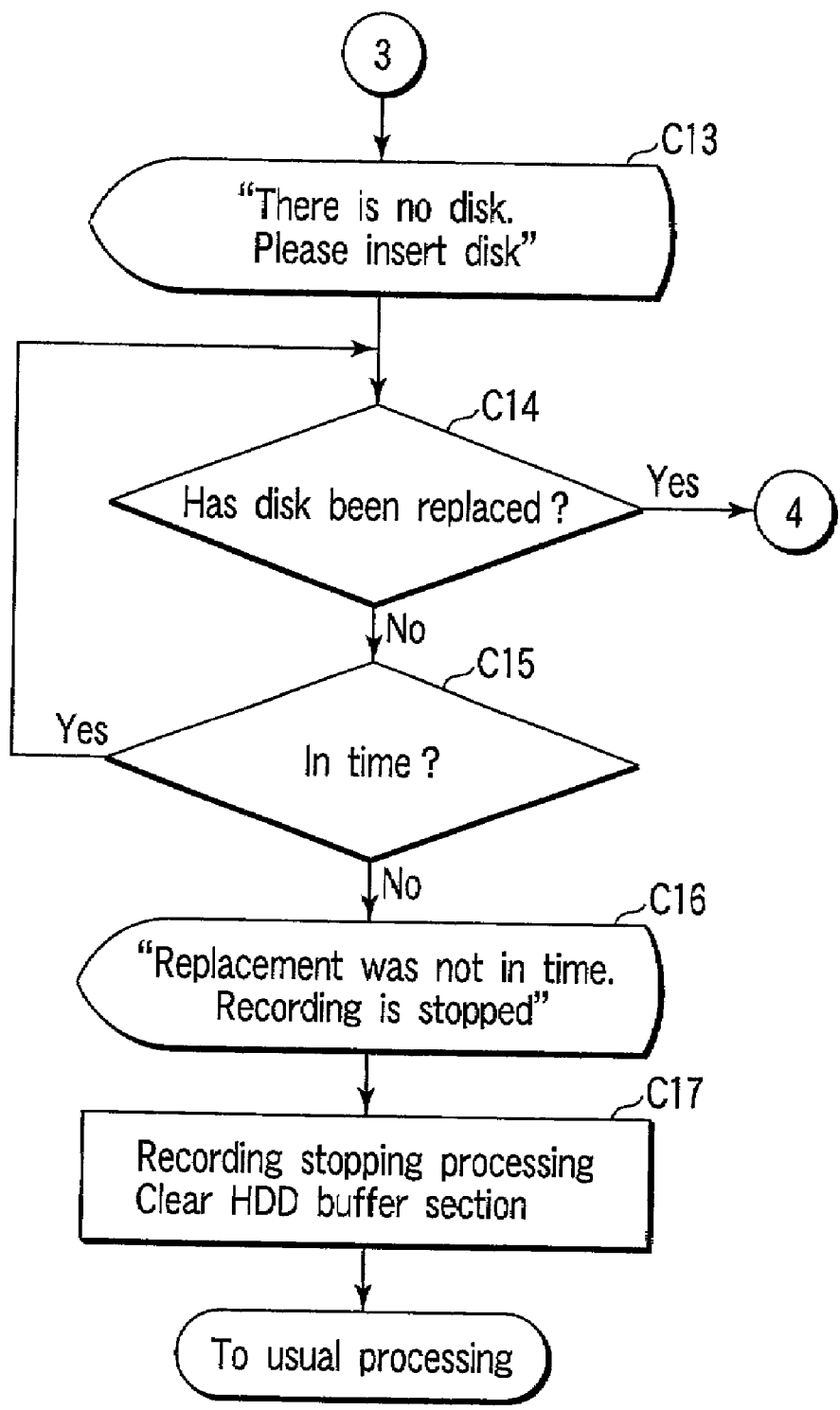
FIG. 13 is a flowchart showing a second part of the disk replacement processing.

FIG. 12 is a flowchart showing the disk replacement processing of FIG. 10. Here, the replacing of disks or the inversion of disks will be described.

The microcomputer block 30 controls a disk changer section 300 to execute disk replacement processing or disk inversion processing (hereinafter, both will be called disk replacement processing). When the routine proceeds into the disk replacement processing, "currently replacing disk" is displayed on the screen (step C1), and the microcomputer block 30 outputs a disk stop instruction to the disk drive 35 (step C2). The disk drive 35 outputs a processing end status in response to the disk stop instruction. When the microcomputer block 30 receives the processing end status (step C3, YES), the microcomputer block 30 sets the AV data to be transferred to the hard disk drive device 2001 in CDA units (step C4).

Next, the microcomputer block 30 outputs a disk replace instruction to the disk changer section 300 (step C5). The disk changer section 300 which receives the disk replace instruction drives the tray on which the disk is loaded so as to be in a state in which disk replacement is possible. Namely, the tray is sent out to the exterior of the device. Here, the user turns the disk on the tray over or loads a new disk on the tray, and pushes the tray in toward the device. The pushed-in tray moves into the inner portion of the device, and at this time, the disk drive 35 outputs a processing end status in response to the disk replace instruction. When the microcomputer block 30 receives the processing end status (step C6, YES), the presence/absence of a disk on the tray is checked.

If a disk exists on the tray (step C7, YES), the management data is read out from the disk on the tray (step C8), and the free capacity is checked. If there is no free capacity (step C9, NO), the microcomputer block 30 outputs a disk replace instruction to the disk changer section 300 again (step C5). If there is free capacity (step C9, YES), the address of the writing destination is determined (step C10), the file system is read, the VMG is read (or prepared), the VMG table is prepared (step C11), and the recording bit rate is set (step C12). When the routine moves into the disk replacement processing in the midst of recording, the recording bit rate set after the completion of the disk replacement processing may be the same as the recording bit rate before the disk replacement processing. Further, the recording bit rate may be newly recalculated from the remaining recording time and the remaining capacity of the disk.

If there is no disk on the tray (step C7, NO), "There is no disk. Please insert a disk." is displayed on the screen (step C13). When the disk is replaced (step C14, YES) or the disk is turned over (step C14, YES), the processing moves on to step C8. If the disk has not been replaced for a predetermined period of time (step C15, NO), "Replacement was not in time. Recording has been stopped." is displayed on the screen (step C16). Moreover, recording stopping processing is carried out, and the portion which was recorded on the hard disk (e.g., the duplicate recorded portion) is cleared (step C17), and the operation moves to the usual processing.

Figure 14:
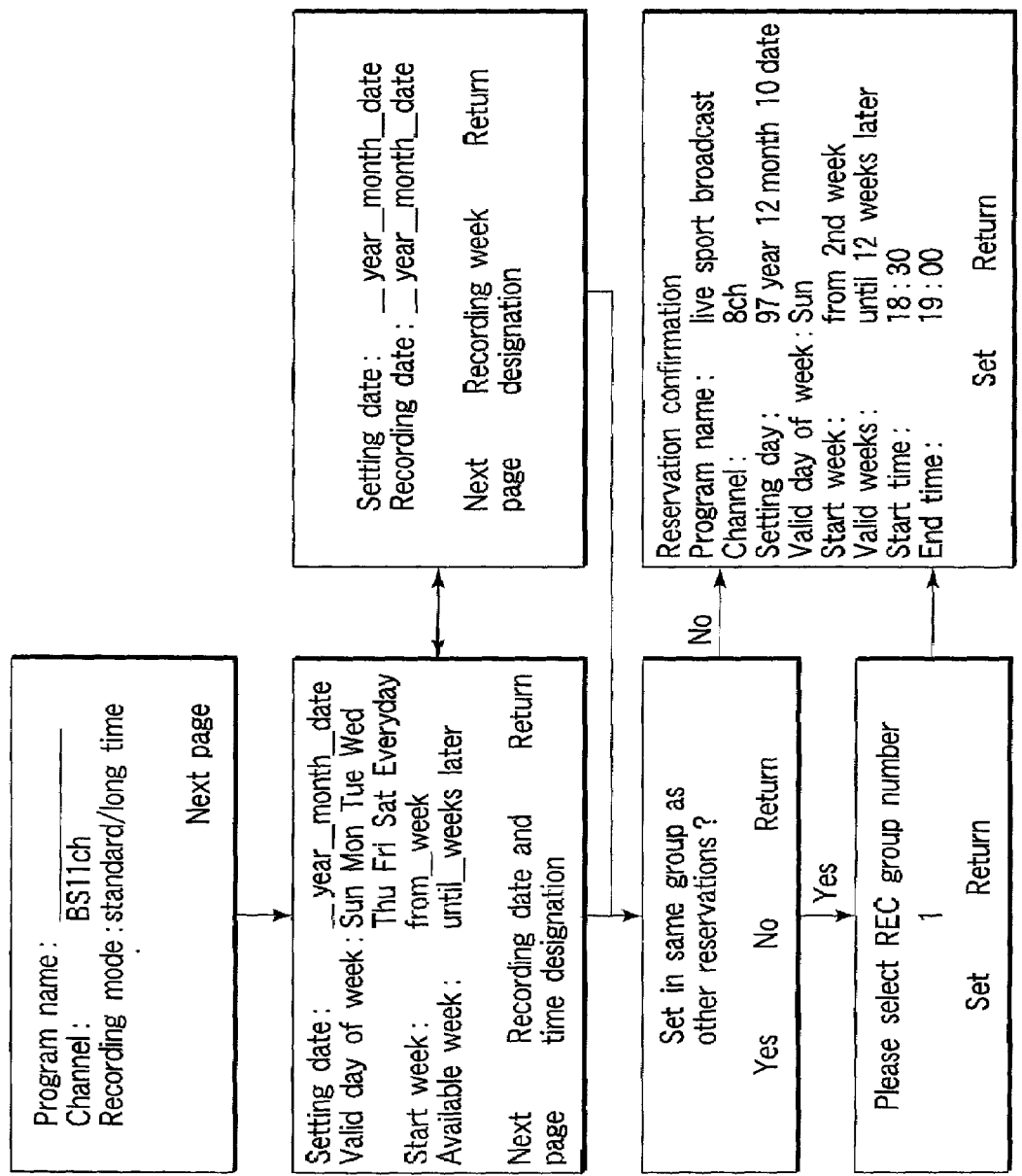
FIG. 14 is a figure showing a flow of setting of recording reservation information.

FIG. 14 is a figure showing an example of display screens at the time of setting the recording reservation information.

When the routine moves to the recording reservation information setting mode, first, a setting screen for the program name, the channel, and the recording mode is displayed. Next, a setting screen for the setting day, the valid day of the week, the starting week, and the valid week is displayed. Next, an inquiry screen which inquires whether the reservation is set or not for the same groups as other reservations is displayed, and the selection screen of the REC group numbers is displayed. Lastly, a screen for reservation confirmation is displayed.

Figure 15:
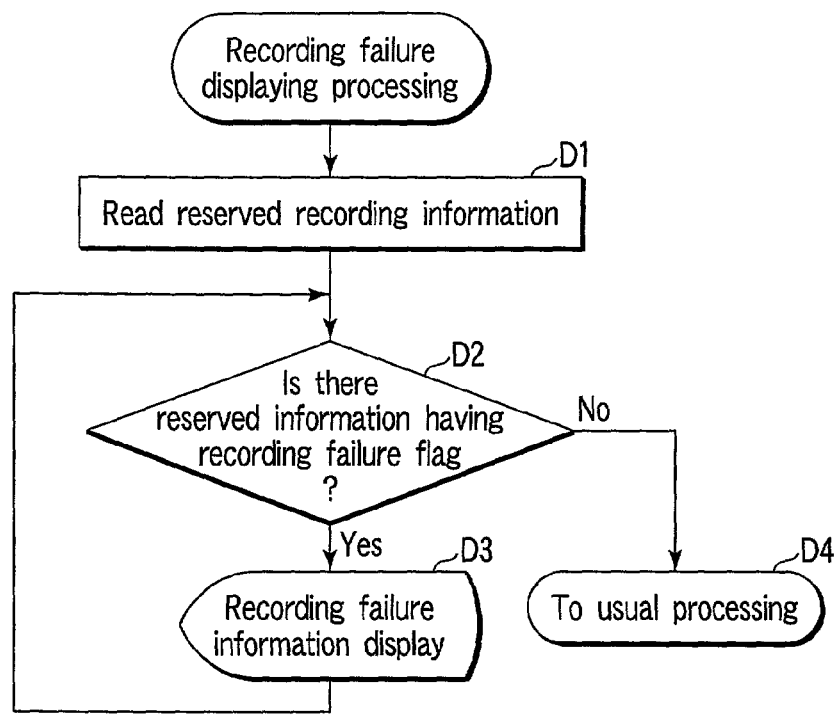
FIG. 15 is a flowchart showing a reserved recording failure display processing.

FIG. 15 is a flowchart showing reservation recording failure displaying processing.

Information relating to a user operation guide menu is read out from a table in which various types of guide information are stored, and a user operation guide menu screen is displayed. From the menu screen, operation moves to a reservation recording failure displaying processing mode. In the reservation recording failure displaying processing mode, first, the reservation recording information is read out (step D1). If there is reservation information having a recording failure flag (step D2, YES), recording failure information is displayed (step D3). If there is no reservation information having a recording failure flag (step D2, NO), the operation moves on to the usual processing (step D4).

Figure 16:
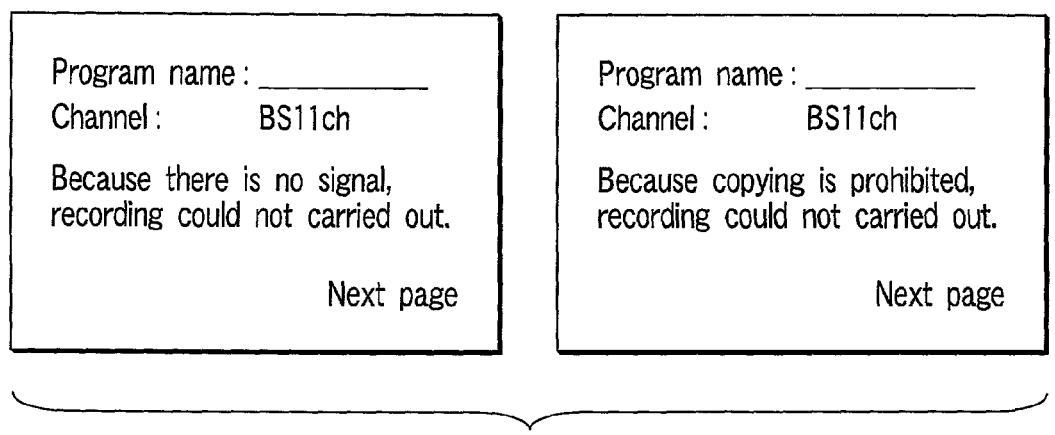
FIG. 16 is a figure showing an example of display of information relating to a reserved recording failure.

FIG. 16 shows an example of displays of the recording failure information. When the target video/audio signal cannot be obtained, "Because there is no signal, recording could not be carried out." or the like is displayed. Further, when copy prohibition information is attached to the target video/audio signal, "Because of copy prohibition, recording could not be carried out." or the like is displayed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording rate automatic setting recording device, comprising:
    recording means for recording a video signal on a predetermined recording surface of an information recording medium;
    reserved recording time detecting means for, on the basis of recording reservation information, detecting a reserved recording time needed for reserved recording;
    remaining capacity calculating means for detecting an entire capacity and a remaining capacity of a first recording surface of the information recording medium which can be accessed by the recording means, and for, assuming a capacity which is at least half of the entire capacity of the first recording surface to be a remaining capacity of a second recording surface of the information recording medium, calculating a capacity, in which the remaining capacity of the first recording surface and the remaining capacity of the second recording surface are added together, as an entire remaining capacity;
    first recording bit rate setting means for setting a recording bit rate, on the basis of the entire remaining capacity calculated by the remaining capacity calculating means and the reserved recording time detected by the recording time detecting means; and
    first recording control means for, in accordance with the recording bit rate set by the first recording bit rate setting means and the recording reservation information, recording a target video signal onto the first and second surfaces of the information recording medium.

2. A recording rate automatic setting recording device according to claim 1, wherein the remaining capacity calculating means calculates the entire remaining capacity after confirming that the information recording medium is a plural-surfaces recordable medium.

3. A recording rate automatic setting recording device according to claim 1, wherein the remaining capacity calculating means assumes the entire capacity of the first recording surface to be the remaining capacity of the second recording surface, and calculates the entire remaining capacity.

4. A recording rate automatic setting recording device according to claim 1, further comprising:
backup recording means for, during a period of time from a state in which the first recording surface can be accessed until a state in which the second recording surface can be accessed, and in accordance with the recording bit rate set by the first recording bit rate setting means, temporarily recording a video signal in a recording section built-in a device different from the information recording medium.

5. A recording rate automatic setting recording device according to claim 1, further comprising:
second recording bit rate setting means for, when a state in which the second recording surface can be accessed is reached, detecting the actual remaining capacity of the second recording surface, and on the basis of the actual remaining capacity of the second recording surface and a remaining recording time of target video data to be recorded onto the second recording surface, setting again a recording bit rate; and
second recording control means for, on the basis of the recording bit rate set again by the second recording bit rate setting means and the recording reservation information, recording the target video signal onto the second recording surface of the information recording medium.

6. A recording rate automatic setting recording device according to claim 4, further comprising:
second recording bit rate setting means for, when a state in which the second recording surface can be accessed is reached, detecting the actual remaining capacity of the second recording surface, and setting the recording bit rate again on the basis of a balance remaining capacity, in which a capacity of the video signal temporarily stored in the recording section is subtracted from the actual remaining capacity of the second recording surface, and the remaining recording time of target video data to be recorded onto the second recording surface; and
second recording control means for, on the basis of the recording bit rate set again by the second recording bit rate setting means and the recording reservation information, recording the target video signal onto the second recording surface of the information recording medium.

7. A recording rate automatic setting recording method, comprising:
detecting a reservation recording time needed for reserved recording on the basis of recording reservation information;
detecting an entire capacity and a remaining capacity of a first recording surface of an information recording medium;
assuming a capacity which is at least half of the entire capacity of the first recording surface to be a remaining capacity of a second recording surface of the information recording medium;
calculating a capacity, in which the remaining capacity of the first recording surface and the remaining capacity of the second recording surface are added together, as the entire remaining capacity;
setting a recording bit rate, on the basis of the entire remaining capacity and the reservation recording time; and
recording a target video signal onto the first and second recording surfaces of the information recording medium in accordance with the recording bit rate and the recording reservation information.

* * * * *